United States Patent [19]

Harada et al.

[11] 4,315,276

[45] Feb. 9, 1982

[54] VIDEO SIGNAL DEFECT COMPENSATION SYSTEM

[76] Inventors: Tsuyoshi Harada, 3223-1 Bushozanchokouchome, Takamatsu-shi, Kagawa-ken; Yoshie Oritake, 7-18-401, Hanamigawa, Chiba-shi, Chiba-ken, both of Japan

[21] Appl. No.: 52,164

[22] Filed: Jun. 26, 1979

[30] Foreign Application Priority Data

Oct. 21, 1978 [JP] Japan .................................. 53-129751

[51] Int. Cl.³ ............................................... H04N 5/76
[52] U.S. Cl. ......................................... 358/8; 360/38
[58] Field of Search ................ 358/4, 1, 22, 127, 183, 358/185, 41, 181, 8, 147, 146, 128.5; 179/100.1 C, 100.11; 360/12, 38, 72.1, 79, 61; 369/15

[56] References Cited

U.S. PATENT DOCUMENTS

| | | | |
|---|---|---|---|
| 3,291,919 | 12/1966 | Robitaille | 360/72.1 |
| 3,573,359 | 4/1971 | Guisinger | 360/38 |
| 3,825,947 | 7/1974 | Rubin et al. | 360/12 |
| 3,889,290 | 6/1975 | Seaton | 360/12 |
| 4,115,810 | 9/1978 | Mikado | 358/181 X |
| 4,172,264 | 10/1979 | Taylor et al. | 358/185 |
| 4,183,058 | 1/1980 | Taylor | 358/127 |
| 4,199,780 | 4/1980 | Taylor | 358/8 |
| 4,199,788 | 4/1980 | Tsujimura | 358/183 |

OTHER PUBLICATIONS

Kyokai, "A Still-Picture Multiplexed Television System", NHK Lab. Note, No. 194, pp. 2-11, Feb. 1976.

Primary Examiner—Robert S. Tupper
Assistant Examiner—Donald McElheny, Jr.
Attorney, Agent, or Firm—Steele, Gould & Fried

[57] ABSTRACT

A video signal defect compensation system is adapted to display an image on a video monitor without interruption. A video signal defect compensation device is adapted to reproduce a video signal, for a restricted time interval, from a memory medium on which a desired video program is recorded, and a video signal generator is adapted to continuously generate a predetermined video signal. Through a switching circuit, a video signal is selectively supplied from the video signal reproducing device or video signal generator to the video monitor. The switching circuit is controlled by a means for detecting whether or not the video signal reproducing device produces an output, and supplies a video signal to the video monitor while the video signal defect compensation device delivers the video signal, and supplies a video signal from the video signal generator to the video monitor while the video signal from the video signal reproducing device is interrupted.

8 Claims, 6 Drawing Figures

F I G. 1
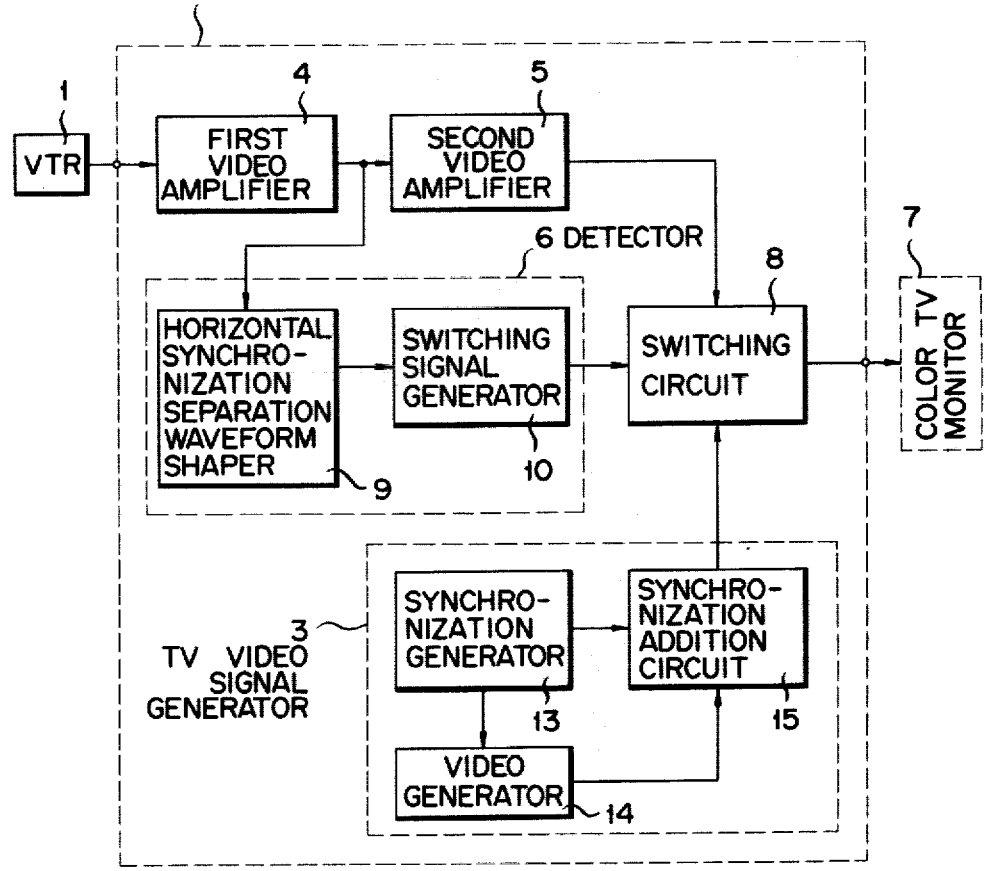
F I G. 2
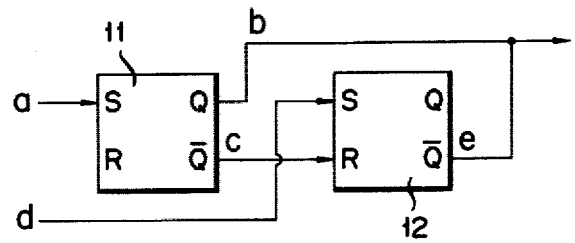

VIDEO SIGNAL DEFECT COMPENSATION SYSTEM

BACKGROUND OF THE INVENTION

This invention relates to a video signal defect compensation system for compensating a dropped out video signal, when displaying a reproduction output of a video signal reproducing device, such as a video tape recorder and video disc player, on a video monitor, and in particular a video signal defect compensation system for causing a video display on a video monitor to be automatically switched to another display during the reproduction interruption or stopping time of a video signal reproducing device to thereby attain an uninterrupted image display on the video monitor.

In the mercantile or service-trade shop, in general, a video program is repetitively reproduced from a video tape recorder and displayed on a video monitor for merchandise publicity or as a business guide. In this case, the video tape recorder often includes an automatic repetition reproducing mechanism for effecting automatic repetition of a program. However, no reproduction output is normally obtained during an automatic wind-back of a tape as is involved from the ending to the restarting of program reproduction. During such reproduction interruption time, no image, except for a raster, is displayed on the video monitor, or an unsightly noise image appears on the monitor since noise signals are introduced during the windback time. Such wind-back time, though dependent upon the length of a program, is relatively long and the presence or absence of a program to be restarted, as well as the wait time taken for a program to be restarted, is unknown to the monitor viewer. If, in addition to this, a noise appears on the monitor, an unpleasant feeling such as apprehension or irritation is imparted to the viewer or client. For this reason, the client leaves the place before a program is restarted, or disregards such program, the video program therefor failing to attract the client's interest in the merchandise or the service offered. In some tape recorders, a reproduction operation is stopped after the ending of program reproduction and rewinding is manually effected. During such reproduction stopping time, or during the tape replacement time or under-repair time, only an unchanging raster remains on the monitor for a longer time. Even in this case, the monitor viewer experiences an uneasy feeling since the wait time is unknown. It is also difficult, for the client within the viewing distance of the monitor, to focus attention on a program on the monitor. Thus, sufficient publicity effects can not be obtained.

SUMMARY OF THE INVENTION

One object of this invention is to provide a video signal defect compensation system which, when the normal supply of a video signal from a video signal reproduction device to a video monitor is interrupted, automatically switches the input of the video monitor from the video signal reproduction device to a video signal generator which provides a constant image on the video monitor.

Another object of this invention is to provide a video signal defect compensation system which can automatically and quickly switch between video signal supply sources without errors, in response to the presence or absence of a reproduction output from a video signal reproduction device. Another object of this invention is to provide a video signal defect compensation system which can cause an image displayed on a video monitor to be switched to an interesting image of free movement, corresponding to a video signal generated from a video signal generator.

These and other objects are accomplished by a video signal defect compensation system comprising a video monitor for displaying an image, a video signal reproduction device and a video signal generator which together constitute a video signal supply source for the video monitor, means for detecting the presence or absence of a reproduction output of the video signal reproduction device, and means adapted to be controlled by the detecting means to switch the video signal supply source from the video signal reproduction device to the video signal generator and vice versa.

BRIEF DESCRIPTION OF THE DRAWING

FIG. 1 is a block diagram showing a video signal defect compensation system according to the embodiment of this invention;

FIG. 2 is circuit diagram showing the switching signal generator of FIG. 1;

DETAILED DESCRIPTION OF THE INVENTION

Figure 3:
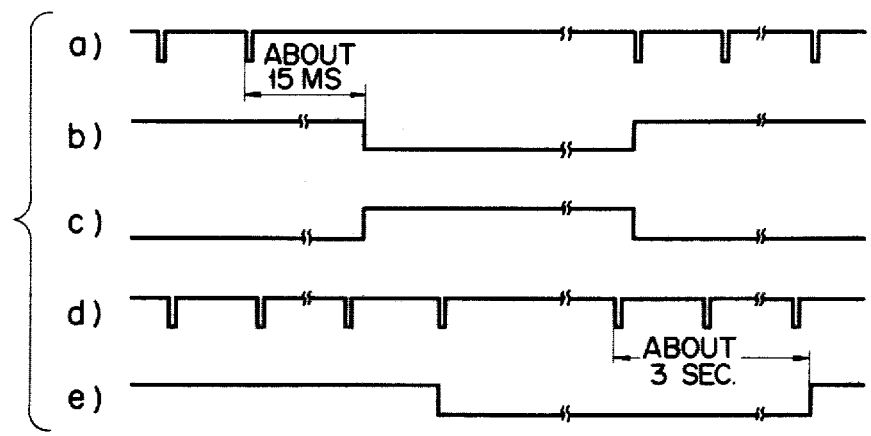
FIG. 3 is a timing chart for the switching signal generator of FIG. 2.

In FIG. 1, reference numeral 1 designates a video tape recorder (hereinafter referred to as VTR); 7, a color TV (television) monitor; and 2, an interface provided between the VTR and the color TV monitor. The interface 2 comprises a TV video signal generator 3 for producing a desired TV video signal, first and second video amplifiers 4 and 5 for amplifying a reproducing video output of VTR 1, a detector 6 for detecting the presence of said reproducing video output, and a switching circuit 8 controlled by the detection output of the detector 6 to select either the reproducing video output of VTR 1 or the video output of the signal generator 3 according to the presence or absence of the reproducing video output for transmission to the color TV monitor 7. The first video amplifier 4 receives a reproducing output (video band) derived from a so-called monitor output terminal of VTR 1 and amplifies it. The second video amplifier 5 amplifies the output of the first video amplifier 4 and supplies the amplified output to a first input terminal of a switching circuit 8. A video output of a TV video signal generator 3 is applied to a second input terminal of the switching circuit 8. The switching circuit 8 selectively gates through either the signal on its first input terminal on the signal on its second terminal according to the output of the detector 6, which is either a voltage or logic level "1" or "0".

The detector 6 comprises a horizontal synchronization separating waveform shaper 9 and a switching signal generator 10. The waveform shaper 9 amplitude-separates a synchronizing signal in an input signal which is supplied from the first video amplifier 4. The signal is passed through a capacitor where a horizontal synchronizing signal component is separated. The resultant signal is subjected to waveform shaping to provide a horizontal synchronizing pulse. The synchronizing pulse is supplied to a switching signal generator 10. If the switching signal generator continuously detects that the input synchronizing pulse is dropped a plurality of times, it generates a "0" level detection output. If after such signal detection an input synchronizing pulse is again detected, the switching signal generator generates a "1" level detection output approximately a predetermined time after that detection point. That is, the switching signal generator is such that, as shown for example in FIG. 2, the input synchronizing pulse (see a in FIG. 3) is supplied to the set terminal S of a first retriggerable monostable multivibrator 11, an external synchronizing pulse (d in FIG. 3) of horizontal synchronization is supplied to the set terminal S of the second retriggerable monostable multivibrator, the $\overline{Q}$ output (c in FIG. 3) of the first monostable multivibrator 11 is supplied to the reset terminal of the second monostable multivibrator 12, and the Q output (b in FIG. 3) of the first monostable multivibrator 11 and $\overline{Q}$ output (e in FIG. 3) of the second monostable multivibrator 12 are wired-OR-connected. The external synchronizing pulse can be generated from an exclusive synchronizing pulse source not shown, but it can be supplied from a synchronization generator (13 in FIG. 1) of the TV video signal generator (3 in FIG. 3).

As mentioned above, the detector 6 continuously detects that the horizontal synchronizing pulse is dropped a predetermined number of times, for example, for about 15 milliseconds per image, and generates a detection output "0" representative of the absence of the reproducing video output. This is because, even if the horizontal synchronizing signal in the reproducing video output is sometimes dropped during the normal operation of VTR 1 such a phenomenon is prevented from being misjudged as the lack of the reproducing video output. In order to avoid such occurence, a detection output "0" may of course be generated immediately after detection of the drop of the horizontal synchronizing signal. As also mentioned above, the reason why in the detector 6 a detection output "1" representative of the presence of the reproducing video output is generated after lapse of about a predetermined time such as about 3 seconds from the redetecting of the horizontal synchronizing pulse is as follows;

(1) When the first monostable multivibrator 11 is erroneously operated by, for example, a one-shot external noise pulse, the Q and $\overline{Q}$ outputs of the first monostable multivibrator are level-inverted a short time determined by a time constant of the first multivibrator. Even if an external synchronizing pulse is inputted into the second monostable multivibrator 12 during such a short level inversion time, it is required that in order to invert the output level of the second monostable multivibrator 12 after a predetermined time (about 3 seconds in this case) in response to the input pulse the multivibrator 11 remain level-inverted during this time period. Since, however, such level-inverted output is due to an erroneous operation, reinversion to an original level is effected after a short time an thus the output of the second monostable multivibrator 12 is not subject to an influence from the one-shot external noise pulse.

(2) Immediately after the restarting of a reproducing operation of VTR 1 there is a general tendency for a synchronizing signal in the reproducing video output to be dropped and at this time it is often rather preferable that the video generation output be displayed as it is.

Figure 4:
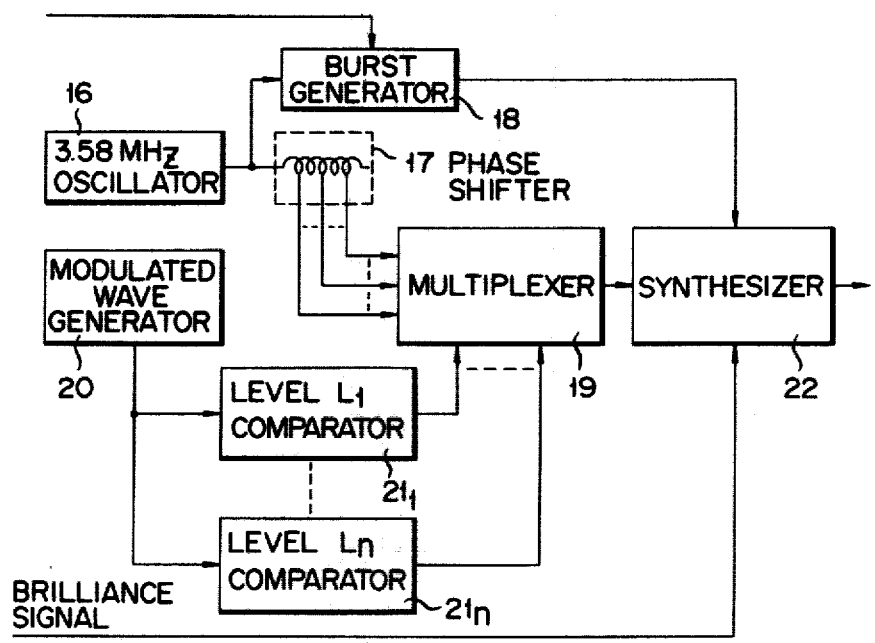
FIG. 4 is the block diagram showing a video generator of FIG. 1.

The TV video signal generator 3 comprises a video generator 14 for generating a video signal to display an image pattern onto the T.V. monitor, synchronization generator 13 for generating a composite synchronizing signal and synchronizing addition circuit 15 for adding the synchronizing signal to the video signal to produce a composite color video signal. The video generator 14 is constructed as shown, for example in FIG. 4. A color subcarrier output of a 3.58 MHz oscillator 16 is supplied to a phase shifter 17 and burst generator 18. The burst generator 18 extracts the above-mentioned color subcarrier output during the period of a burst flag pulse supplied from the synchronization generator 13 to generate a color burst signal. The phase shifter 17 phase-shifts the color subcarrier output and the phase shift outputs of the phase shifter different in their phase from each other are applied to a plurality of input terminals of a multiplexer 19. A modulated wave generator 20 generates a sinusoidal wave of predetermined frequency and the sinusoidal output of the generator 20 is supplied to a plurality of level comparators $21_1$ to $21_n$ having different reference levels $L_1$ to $L_n$, respectively to produce pulsed outputs. The pulsed outputs are supplied to a plurality of control input terminals of the multiplexer 19 where the phase shift outputs of the phase shifter 17 are selectively switched according to a combination of the pulsed outputs to produce an output. The output of the multiplexer is supplied, as a carrier color signal having a phase variation corresponding to the amplitude variation of said sinusoidal wave, to a synthesizer 22 where it is synthesized together with said color burst signal and brightness signal to produce a color video signal. The brightness signal may have a predetermined level or use may be made, as such, of a wipe key signal ("1" level corresponds to high brightness and "0" level corresponds to low brightness) for obtaining a brightness variation corresponding to a desired wipe pattern on a monitor 7. If use is made of a key signal obtained by converting according to a predetermined reference level to a pulse form a synthesized signal which is obtained by superimposing a triangular wave produced during the horizontal scanning period onto an integrated wave having a period sufficiently longer than the vertical scanning period, it is possible to visually observe a wipe pattern gradually moving from the vertical center portion of a screen toward the right and left side thereof. If in this case the integrated wave is level-inverted, it is possible to obtain a wipe pattern moving from the right and left sides of the screen toward the center thereof. If the timing in which the integrated signal is produced is controlled by a control signal, for example, the detection output "1" or "0" of the detector 6 and wipe ending judgment is made by the level of the integrated wave to suspend a "wipe" operation, it is possible to produce a wipe pattern only during the time of switching from the reproducing video output to the video signal generation output and only during the time of switching from the video signal generation output to the reproducing video output. Although in the above-mentioned embodiment the "wipe" key signal is generated in analog fashion, it is also possible to generate the wipe key signal in digital fashion. In this case it is only necessary that a data array of word units be stored in a-n addresses of a read only memory (hereinafter referred to as ROM) according to a variation of the key signal "1" array of the horizontal scanning time interval and a wipe key signal be produced whose generation timing pulse is controlled according to the data array read out by scanning the address a-n of the ROM at low speed.

The color video signal produced by the video generator 14 is supplied to the synchronization addition circuit 15 as shown in FIG. 1 where it is added with a composite synchronizing signal from the synchronization generator 13 to produce a color composite video signal. The synchronization generator 13 includes a horizontal oscillator of synchronizing type. If a horizontal synchronizing pulse output of the detector 6 is supplied as a synchronizing input to the horizontal oscillator, the horizontal oscillator oscillates when a synchronizing input is supplied and self-oscillates when no synchronizing input is supplied. The generation or no generation of the video signal of the TV video signal generator 3 may be controlled by the detection output "0" or "1" of the detector 6.

The arrangement of the video reproducing device of FIG. 1 will be explained below.

During the reproduction time a reproducing video output is amplified by the first and second video amplifiers 4 and 5 and supplied to the switching circuit 8. The output of the first video amplifier 4 is branched to the detector 6 where the presence or absence of the reproducing video output is detected. The TV video signal generator 3 delivers a video signal corresponding to a desired image to the switching circuit 8. The switching circuit 8 selectively receives an output of the second video amplifier 5 i.e. a reproducing video output or a video output of the video signal generator 3 to produce an output according to the detection output of the detector 6.

According to the video reproducing device, when a reproducing output of a video program ceases to exist during the reproduction interruption time such as an automatic wind-back time or during the reproduction stopping time such as a reproduction ending time, the video outputs of an image, for reproduction example, queueing information or reproduction ending alarm or a varying interesting image, can be automatically selected for display on the color monitor 7, until a reproduction output reappears. In consequence the appearance of a raster display or a noise display on the monitor 7 during the reproduction interruption time or reproduction stopping time can be inhibited. Thus no apprehension or unpleasant feelings are imparted to a monitor viewer such as a client in the shop. Rather, an advertising message may be imparted to the monitor viewer. This invention is not restricted to the above-mentioned embodiment. Instead of VTR 1 use may be made of another TV video signal reproducing device such as a video disc reproducing device. Although the detector 6 detects the presence or absence of a reproducing video signal by detecting a horizontal synchronizing signal in a reproducing video output, this can be done by detecting a vertical synchronizing signal instead of said horizontal synchronizing signal or by detecting a control signal for reproduction starting or stopping, which instructions are beforehand stored in a portion of a video signal recording medium (e.g. a control track of a magnetic tape) of VTR 1.

Figure 5:
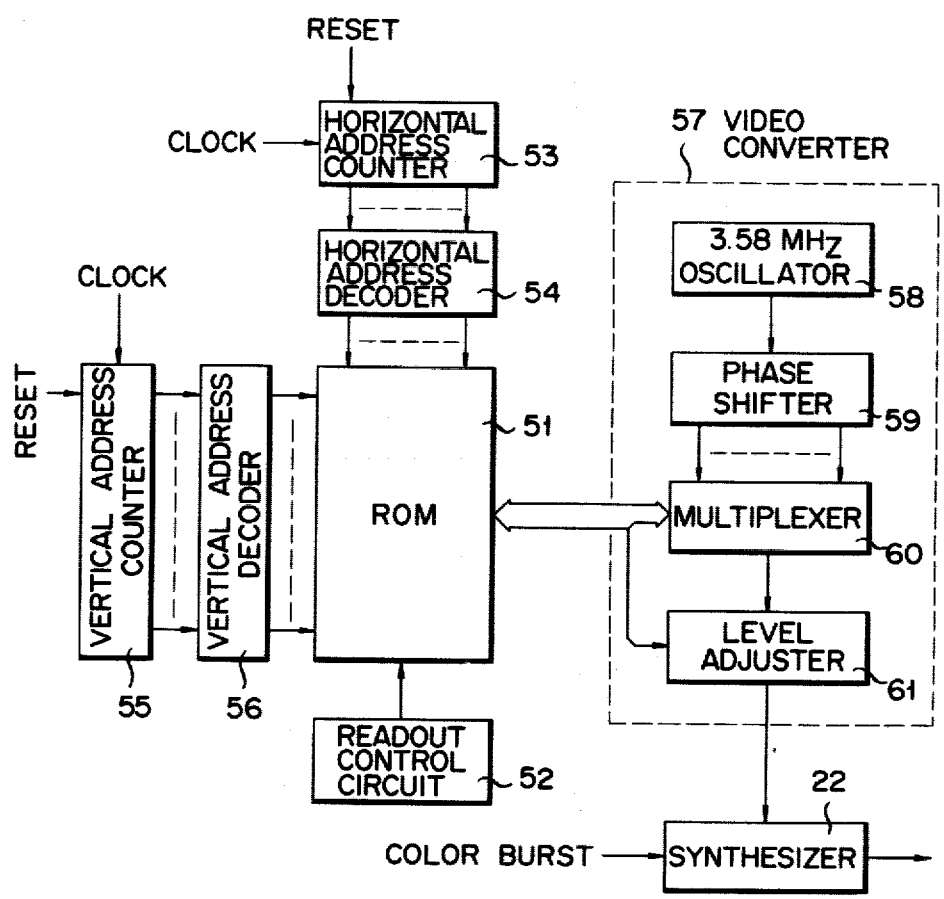
FIG. 5 is a block diagram showing another form of a video signal generator.

The video generator 14 of the TV video signal generator 3 may be changed in a variety of ways. For example, if ROM 51 as shown in FIG. 5, is used, data on a very detailed image can be stored. That is, digital data of word units including, for example, 1 bit representative of brilliance data for each picture element and 4 bits representative of color data is stored in the address of ROM 51 which is assigned to the corresponding one of picture elements of predetermined size into which a desired still picture is divided. In this case, a readout control circuit 52 is provided which repeatedly sends still image data from ROM 51. A horizontal address counter is adapted to be reset by a horizontal synchronizing pulse and to count high-speed clocks corresponding to the horizontal resolution of the picture elements, and a vertical address counter 55 is adapted to be reset by the vertical synchronizing pulse and to count clocks corresponding to the vertical resolution of the picture elements. The address designation of ROM 51 is effected by delivering the output of the horizontal address counter 53 to a horizontal address decoder 54 and output of the vertical address counter 55 to a vertical address counter 55. A video converter 57 is also provided which produces a video signal corresponding to the still image using the readout output of ROM 51. In the video converter 57 the color subcarrier output of 3.58 MHz oscillator is delivered to a phase shifter 59 where a plurality of carrier color signals different in their phases from each other are produced. The output of the phase shifter 59 is supplied to a multiplexer 60. The multiplexer is controlled by the bit output of said color data to cause a carrier color signal to be selectively produced according to the color data. The output of the multiplexer 60 is supplied to a level adjuster 61 for saturation setting. The level adjuster 61 is controlled by a bit output for brilliance data and sets the magnitude of the carrier color signal. Finally the output of the level adjuster is supplied to a synthesizer 62 where it is synthesized with the color burst signal.

If the readout control circuit is constructed such that the ROM 51, used for storing a plurality of still picture data, can be selectively addressed in a desired sequence, and its data repeatedly read out a desired number of times, a varied monitor image can be displayed, for example, during the reproduction suspension time. An ingenuous combination of such images enables more effective publicity.

Figure 6:
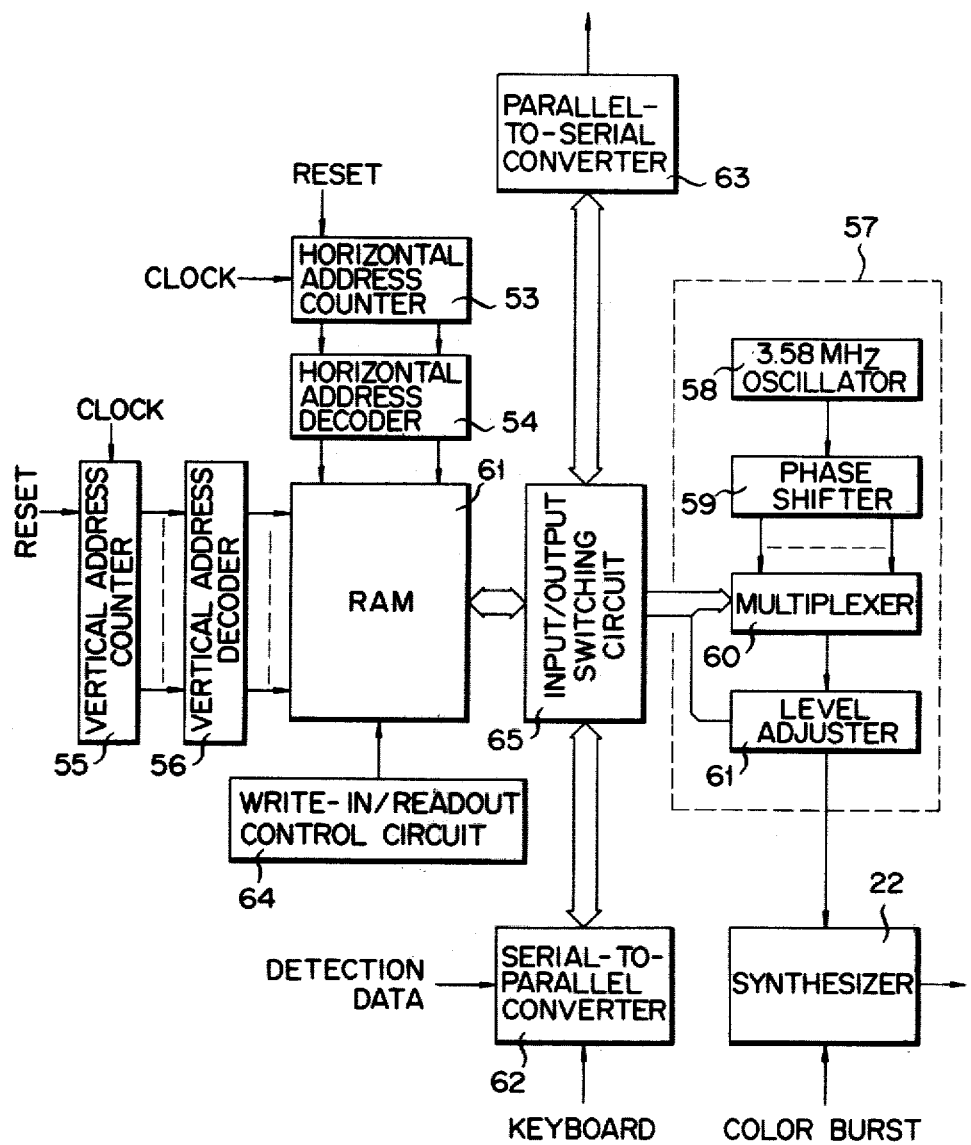
FIG. 6 is a block diagram showing yet another form of a video signal generator.

If a random access memory (hereinafter referred to as RAM) 61 is used, as shown in FIG. 6, in place of ROM 51, a memory image can be readily rewritten. Where digital data of a desired storage image suitable for the contents of a program, for example, on a sound track of VTR 1 is beforehand recorded in a position ahead of said program and a data extraction circuit for extracting said digital data from a reproducing video output is provided, a proper image display fit for the contents of said program is advantageously obtained during the reproduction interruption time.

If the digital data is, for example, of a serial mode, it is necessary that it be converted by a serial-to-parallel converter 62 to parallel data for supply to RAM 61. By a key operation on a keyboard (not shown), for example, data can be written through the serial-to-parallel converter 62 into RAM 61. Such data may be read out from RAM 61 and transferred for storage in serial mode, for example, on the sound track of VTR 1. To this end, a readout output of RAM 61 may be converted by a parallel-to-serial converter 63 to a serial mode. Reference numeral 64 in FIG. 6 shows a write-in/readout control circuit and 65 shows an input/output switching circuit. The same reference numerals are employed in FIG. 6 to designate parts or elements similar to those shown in FIG. 5 and further explanation thereof is omitted for brevity. When the level inversion of the detection output of the detector 6 is judged i.e. when mutual switching is effected between the reproducing video output and the video generation output, a "wipe" key signal may be produced and used in preference to the detection output. At the mutual switching time the switching operation of the switching circuit 8 may be controlled by the key signal so that a wipe-like switching can be effected between the reproduction video output and the video generation output.

The detector 6 may detect the presence or absence of a control signal in the reproduction output or of a synchronizing signal in the reproduction video output. The detector 6 may also detect the presence or absence of the reproduction video output by detecting a voltage obtained through detection and rectification of the reproduction video output; a switch operation for non-reproduction mode such as a reproduction interruption or reproduction stopping mode (in the reproducing device of VTR 1) a wind-back or quick-feed mode; or a switch signal per se as obtained by the switch operation.

According to this invention, a desired image can be automatically displayed on the video monitor even at the reproduction interruption or stopping time without having an apprehensive or an unpleasant feeling imparted to the monitor viewer. Rather, the interest of the monitor viewer is captured by an aggressive publicity message on the monitor, thus providing many effects.

What we claim is:

1. A video signal defect compensation system for use with a video signal reproducing device, the device having a reproduction video signal output corresponding to a prerecorded program displayed on a video monitor, comprising:

means for detecting the presence or absence of the reproduction video signal, said detecting means comprising:

a synchronization separating circuit for separating the synchronizing signal from the reproduction video signal of the video signal reproducing device; and, a switching signal generator for receiving the synchronizing signal separated by the synchronization separating circuit and for producing a first switching control signal representing the absence of the reproduction video signal, when a plurality of drop outs occurs in the synchronization separating circuit signal output and for producing a second switching control signal representing the lapse of a predetermined time from when the synchronization separating circuit detects the synchronizing signal after absence of the reproduction video signal has been previously determined;

a video signal generator for generating a composite video signal to be displayed on the monitor when the reproduction video signal drops out, said video signal generator comprising:

a synchronization generator for generating a composite synchronizing signal;

a video generator for generating a video signal, having information content independent of the prerecorded program, to display an image on the video monitor; and, switching means for selecting either the reproduction signal or the generated composite signal in response to the switching control signals of the detecting means, and for supplying the selected signal to the video monitor, the reproduction signal being selected when the detecting means detects the reproduction signal and the generated composite signal being selected when the detecting means detects the absence of the reproduction video signal, whereby a picture image will be displayed on the monitor whenever the reproduction video signal drops out, but absence of the synchronizing signal immediately after video playback commences will not result in unnecessary interruption of the program.

2. A video signal defect compensation system according to claim 1, wherein the synchronization separation circuit detects a plurality of drop outs of the continuous horizontal synchronizing signal included in the reproduction video signal.

3. A video signal defect compensation system according to claim 1, wherein said video generator comprises:

a circuit for generating a color subcarrier signal;

a phase shifter for phase-shifting the color subcarrier signal derived from the color subcarrier signal generating circuit to produce a plurality of phase-shifted outputs which are different in their phase from each other;

a modulated wave generator for generating a sinusoidal wave signal having a constant frequency;

a plurality of level comparators for translating the sinusoidal signals of the modulated wave generator into pulses at mutually different reference levels;

a multiplexer for selectively switching the phase-shifted outputs of the phase-shifter corresponding to a combination of pulsed outputs of the comparators;

a burst generator for extracting the color subcarrier signal during the period of a burst flag pulse supplied from the synchronization generator to produce a color burst signal; and, a synthesizer for adding the color burst signal and a brightness signal to a carrier color signal derived from the multiplexer to produce a color video signal.

4. A video signal defect compensation system according to claim 3, wherein said synthesizer adds the color burst signal and a wipe key signal, the wipe key signal having a brightness variation corresponding to a desired wipe pattern, to the carrier color signal derived from the multiplexer, to produce a color video signal for displaying a wipe pattern image which represents the wipe pattern gradually moving from the vertical center portion of a screen toward the right and left side thereof and vice versa.

5. A video signal defect compensation system according to claim 1, wherein said video generator comprises:

a read only memory for storing digital data corresponding to at least one desired still image;

an address designation circuit for addressing the read only memory to read out the digital data from the read only memory;

a read out control circuit for repeatedly reading the still image data from the read only memory and for effecting a repeated read out operation a desired number of times;

a video converter for producing a video signal corresponding to the still image using the read out data of the read only memory; and, a synthesizer for adding a color burst signal to a carrier color signal derived from the video converter to produce a color video signal.

6. A video signal defect compensation system according to claim 5, wherein digital data corresponding to a plurality of different still images is stored in the read only memory, and wherein the readout control selects the still image data in a predetermined sequence.

7. A video signal defect compensation system according to claim 1, wherein said video generator comprises:
a random access memory for storing an image data;
an address designation circuit for addressing the random access memory;
a read-write control circuit for writing a predetermined image data into the random access memory and for reading the predetermined image data from the random access memory;
a video converter for producing a video signal corresponding to a picture image using the read out data from the random access memory;
an input-output switching circuit for selecting input image data for supply to the random access memory when the system operates in a write mode, and for selecting output image data read out from the random access memory when the system operates in a read mode; and,
a synthesizer for adding a color burst signal to a carrier color signal derived from the video converter to produce a color video signal.

8. A video signal defect compensation system according to claim 7, further comprising:
an extraction circuit for extracting out a digital data corresponding to a desired image from the reproduction output of the video signal reproduction device, which reproducing video recording medium includes, in addition to an original reproduction video signal, the digital data corresponding to the desired image;
a serial-parallel converter for converting serial output data of the extracting circuit or a serial write-in data corresponding to the desired image to be inputted from a key to a parallel data, and for supplying the parallel data to the random access memory via said input-output switching circuit; and,
a parallel-serial converter for converting parallel data of the desired image read out from the random access memory through the input-output switching circuit to a serial data, and for supplying the serial data to said video signal reproducing device.

* * * * *